United States Patent
Bastian

(10) Patent No.: US 10,250,017 B2
(45) Date of Patent: Apr. 2, 2019

(54) ADAPTER FOR CONTACTING A CIRCUIT BREAKER TO A BUSBAR SYSTEM

(71) Applicant: RITTAL GMBH & CO. KG, Herborn (DE)

(72) Inventor: Andreas Bastian, Dillenburg (DE)

(73) Assignee: Rittal GmbH & Co. Kg (DE)

( * ) Notice: Subject to any disclaimer, the term of this patent is extended or adjusted under 35 U.S.C. 154(b) by 0 days.

(21) Appl. No.: 15/501,375

(22) PCT Filed: Aug. 5, 2015

(86) PCT No.: PCT/DE2015/100329
§ 371 (c)(1),
(2) Date: Feb. 2, 2017

(87) PCT Pub. No.: WO2016/019950
PCT Pub. Date: Feb. 11, 2016

(65) Prior Publication Data
US 2017/0237238 A1  Aug. 17, 2017

(30) Foreign Application Priority Data

Aug. 5, 2014 (DE) .......... 10 2014 111 095
Jul. 16, 2015 (DE) .......... 10 2015 111 560

(51) Int. Cl.
| | |
|---|---|
| *H02B 1/04* | (2006.01) |
| *H02B 1/056* | (2006.01) |
| *H02B 1/21* | (2006.01) |
| *H01R 25/14* | (2006.01) |

(52) U.S. Cl.
CPC ......... *H02B 1/0565* (2013.01); *H01R 25/145* (2013.01); *H02B 1/21* (2013.01)

(58) Field of Classification Search
None
See application file for complete search history.

(56) References Cited

FOREIGN PATENT DOCUMENTS

| | | |
|---|---|---|
| CN | 2624485 Y | 7/2004 |
| CN | 10-1197227 A | 6/2008 |
| CN | 10-1414529 A | 4/2009 |
| DE | 102009023802 A1 | 12/2010 |
| KR | 10-0816102 B1 | 3/2008 |

OTHER PUBLICATIONS

International Search Report (in English and German) and Written Opinion (in German) for PCT/DE2015/100329, dated Oct. 23, 2015; ISA/EP.

*Primary Examiner* — Courtney Smith
(74) *Attorney, Agent, or Firm* — Harness, Dickey & Pierce, PLC

(57) ABSTRACT

An adapter for contacting a circuit breaker to a busbar system, with a casing having a first mounting side to attach and electrically contact the adapter to at least one busbar of a busbar system and a second mounting side to attach and electrically contact a circuit breaker to the casing, characterized in that, on the second mounting side, at least one rotary disk with several sets of threaded inserts for attaching a circuit breaker is fitted so that it can pivot around a rotational axis perpendicular to the mounting sides, wherein each set of threaded inserts is equipped for mounting a particular type of circuit breaker so that for each position of the rotary disk one of the sets of threaded inserts is positioned in a mounting position for a particular type of circuit breaker.

9 Claims, 8 Drawing Sheets

ADAPTER FOR CONTACTING A CIRCUIT BREAKER TO A BUSBAR SYSTEM

CROSS-REFERENCE TO RELATED APPLICATIONS

This application is a 371 U.S. National Stage of International Application No. PCT/DE2015/100329, filed on Aug. 5, 2015, which claims priority to German Application Nos. 10 2014 111 095.1, filed on Aug. 5, 2014 and 10 2015 111 560.3, filed on Jul. 16, 2015. The entire disclosures of the above applications are incorporated herein by reference.

FIELD

The disclosure is based on an adapter for contacting a circuit breaker to a busbar system, with a casing which features a first mounting side for attachment and electrically contacting of the adapter to at least one busbar or a busbar system and a second mounting side for attachment and electrical contacting of a circuit breaker on the casing. An adapter of this sort is known from the DE 10 2009 023 802 A1.

In the field, diverse types and models of circuit breakers often have to be connected mechanically and electrically to a given busbar system. In particular, the mounting holes or screw apertures on the circuit breaker provided for the mechanical attachment of the circuit breaker to the busbar system vary between circuit breakers, in particular in regards to their spacing and thread diameter. From the prior art it is known that a variety of diverse circuit breakers corresponding to the variety of adapters should be designed that can help the respective circuit breakers connect with the busbar system. This has the drawback that there always needs to be a variety of diverse adapters.

BACKGROUND

This section provides background information related to the present disclosure which is not necessarily prior art.

The DE 10 2009 023 802 A1 suggests a solution to this problem in the form of an adapter which incorporates two mounting bars for a circuit breaker in one casing which are stored reversibly in an insert and each mounting bar has several thread holes. This means that each of the several thread holes can take a fastening screw of a particular type of circuit breaker. The mounting bars are fixable in various positions lengthways on the insert to facilitate the required thread hole pattern according to the circuit breaker to be fastened.

Due to the mounting bar's limited movement lengthways, only a limited number of different thread hole patterns can be facilitated using the adapter. Therefore, the purpose of the disclosure is to further develop a generic adapter for the contacting of a circuit breaker to a busbar system such that it is suitable for adapting a variety of diverse circuit breaker types.

SUMMARY

This section provides a general summary of the disclosure, and is not a comprehensive disclosure of its full scope or all of its features.

The invented adapter distinguishes itself in that on the second mounting side at least one rotary disk with several sets of threaded inserts is fitted so that it can pivot around a rotational axis perpendicular to the mounting sides, wherein every set of threaded inserts is designed for a certain type of circuit breaker so that for each position of the rotary disk there is one set of threaded inserts in position for attachment to one particular type of circuit breaker.

Using the rotary disk means that a variety of diverse thread hole patterns can be provided. Furthermore, for the conversion of the adapter from one type of circuit breaker to another, the rotary disk only needs to be turned. In contrast with the known prior art mounting bars, there is effectively no consequential relocation of the rotary disk, it merely changes its alignment when it is turned. Consequently, the invented adapter can have compact dimensions.

One set of threaded inserts should have at least one threaded insert or at least one thread hole. Usually one set of threaded inserts will have two threaded inserts or thread holes. However, one set of threaded inserts can have more than two threaded inserts or thread holes. Circuit breakers are often fixed to the adapter with four thread screws, for example. Therefore, the threaded inserts can be prepared in two vertical offset rows of two threaded inserts or thread holes respectively. All four of the threaded inserts can form a set of threaded inserts which are provided by a rotary disk. However, two threaded inserts can form a set of threaded inserts, wherein both sets of threaded inserts are provided by different rotary disks which are staggered.

For example, in one embodiment of the disclosure, the second mounting side has two of the rotary disks which are positioned staggered on the second mounting side, wherein a first rotary disk has at least one first attachment point for the circuit breaker and a second rotary disk has at least a second attachment point which is positioned staggered to the first attachment point. The attachment points are formed by a first set of threaded inserts which is provided by a first rotary disk or by a second set of threaded inserts which is provided by a second rotary disk.

In one embodiment of the disclosure, the adapter forms a particularly convenient and compact unit which incorporates the rotary disk in the casing, wherein the casing, in particular the second mounting side, has a grip aperture on the periphery of the rotary disk to manually turn the rotary disk. On the periphery of the rotary disk, knurling or other shapes to improve the grip can be formed.

To improve user-friendliness, in one embodiment of the disclosure, the rotary disk is incorporated in the casing, wherein the rotary disk has the indicatory inscription of various sets of threaded inserts, wherein the second mounting side has a viewing window so that precisely one of the inscriptions is visible according to the position of the rotary disk, and wherein the sets of threaded inserts, the inscriptions and the viewing window are positioned so that one indicatory inscription of a certain set of threaded inserts is visible through the viewing window when this set of threading inserts is arranged in the mounting position. In this embodiment, the user must simply put the denoting inscription in the viewing window so that the inscription is visible through the viewing window in order to transfer the appropriate set of threaded inserts into the mounting position in which these threaded inserts are arranged for the mounting of the appropriate circuit breaker.

The second mounting side can have at least one aperture through which the set of threaded inserts is accessible which is in the mounting position, wherein all other sets of threaded inserts are covered by the second mounting side.

The user-friendliness of the invented adapter is also improved in one embodiment of the disclosure where the rotary disk has a substantially circular outer circumference with latches, wherein a latch site corresponding to the latches is formed on a substantially circular inner circumference of a recess in the inside of the casing in which the rotary disk is incorporated, and wherein the sets of threaded inserts, the latches and the latch site are arranged so that the rotary disk takes a lock-in position when one of the sets of threaded inserts is in the mounting position.

To further increase the variability of the invented adapter particularly regarding the adaptable types of circuit breakers, in one embodiment of the disclosure the second mounting side is formed as an optional removable cover for the inside of the casing in which at least one rotary disk is incorporated, wherein the at least one rotary disk in the inside of the casing is mounted interchangeably on a turning shaft, is clipped in particular.

It is conceivable that the adapter has an adapter plate formed as a separate component having at least one rotary disk, wherein the adapter plate is secured to the casing with the at least one rotary disk. The adapter plate can for example be affixed using a releasable connection using a screw or latch connection to an adapter plate insert of the casing. So for example, it is conceivable that the adapter plate is pre-mounted on a circuit breaker so that the circuit breaker and the adapter plate can be attached to the adapter plate insert of the casing by inserting the adapter plate.

Using an adapter plate means that the circuit breaker can be pre-mounted on the adapter plate using the threaded inserts so that the adapter plate simply has to be inserted into a certain adapter plate insert of the casing and fixed there for the final assembly. To attach the adapter plate to the adapter plate insert of the casing the adapter plate can have fastening apertures for screws or similar fixings. The adapter plate can also have a suspension ledge on the lower longitudinal side through which it can be inserted into a respective recess in the adapter plate insert of the casing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
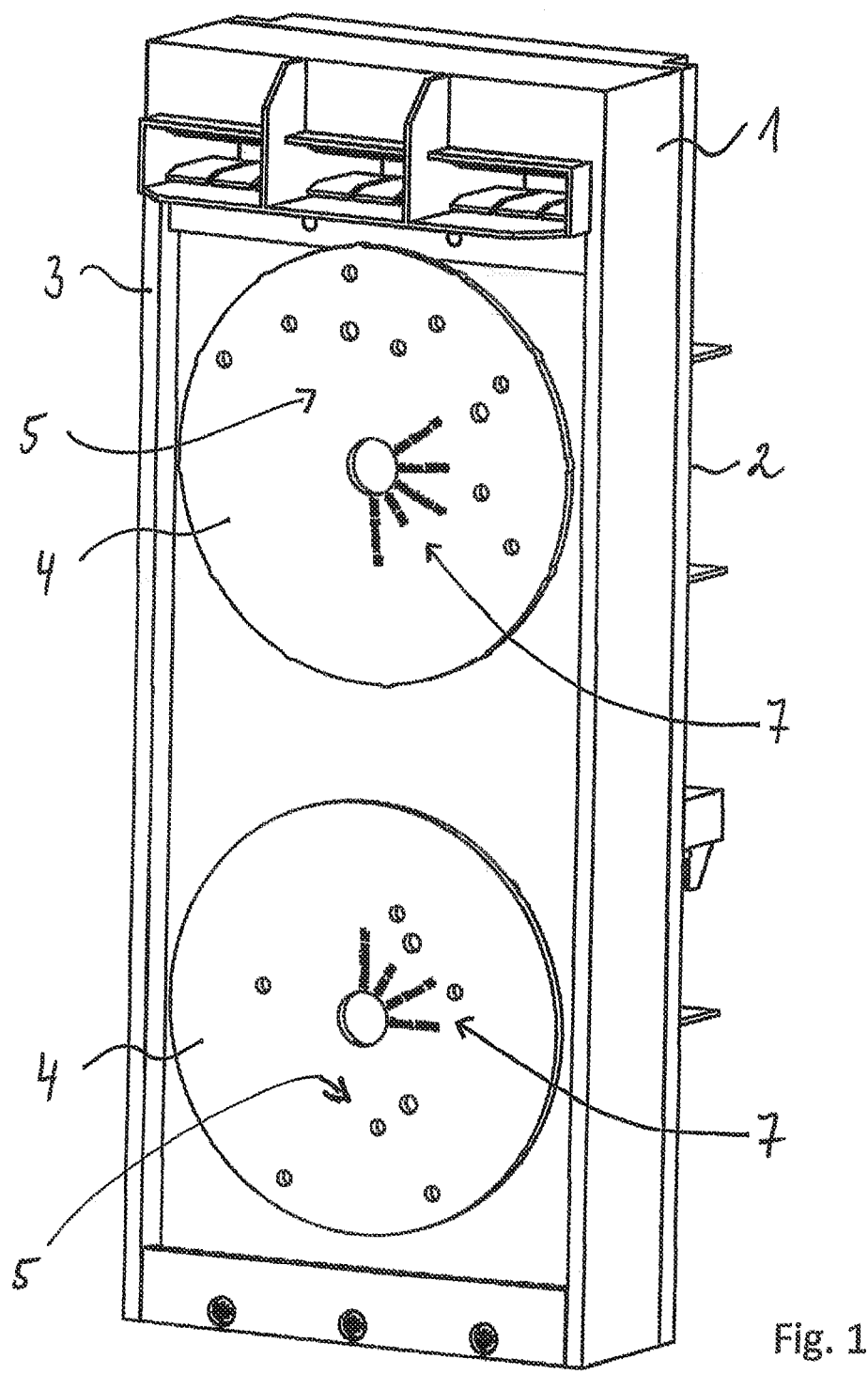
FIG. 1 shows a perspective view from the second mounting side of an embodiment of the invented adapter, wherein the second mounting side has been removed for improved clarity.

In the embodiment of the invented adapter depicted in FIG. 1, the mounting side 3 has been removed apart from the exterior border for increased clarity. In the embodiment depicted in FIG. 1, the mounting side 3 is basically provided by a cover which can be removed if needed, for example to access the rotary disks 4 incorporated inside the casing.

The adapter according to FIG. 1 has two rotary disks, wherein an upper rotary disk 4 is provided for the deployment of the first set of threaded inserts 5 and a lower rotary disk 4, arranged vertically below, for the deployment of a second set of threaded inserts 5. The upper rotary disk 4 provides the threaded inserts 5 for an upper row of mounting holes for the circuit breaker 16 while the lower rotary disk 4 provides a second set of threaded inserts 5 for a lower row of mounting holes for the circuit breaker 16. For example, the circuit breaker 16 can be fixed to the adapter using two upper mounting holes which correspond to two threaded inserts 5 of the upper rotary disk 4 and with two lower mounting holes which correspond to two threaded inserts 5 of the lower rotary disk 4. Inscriptions 7 indicating the sets of threaded inserts 5 are affixed to the upper and lower rotary disks 4.

Figure 2:
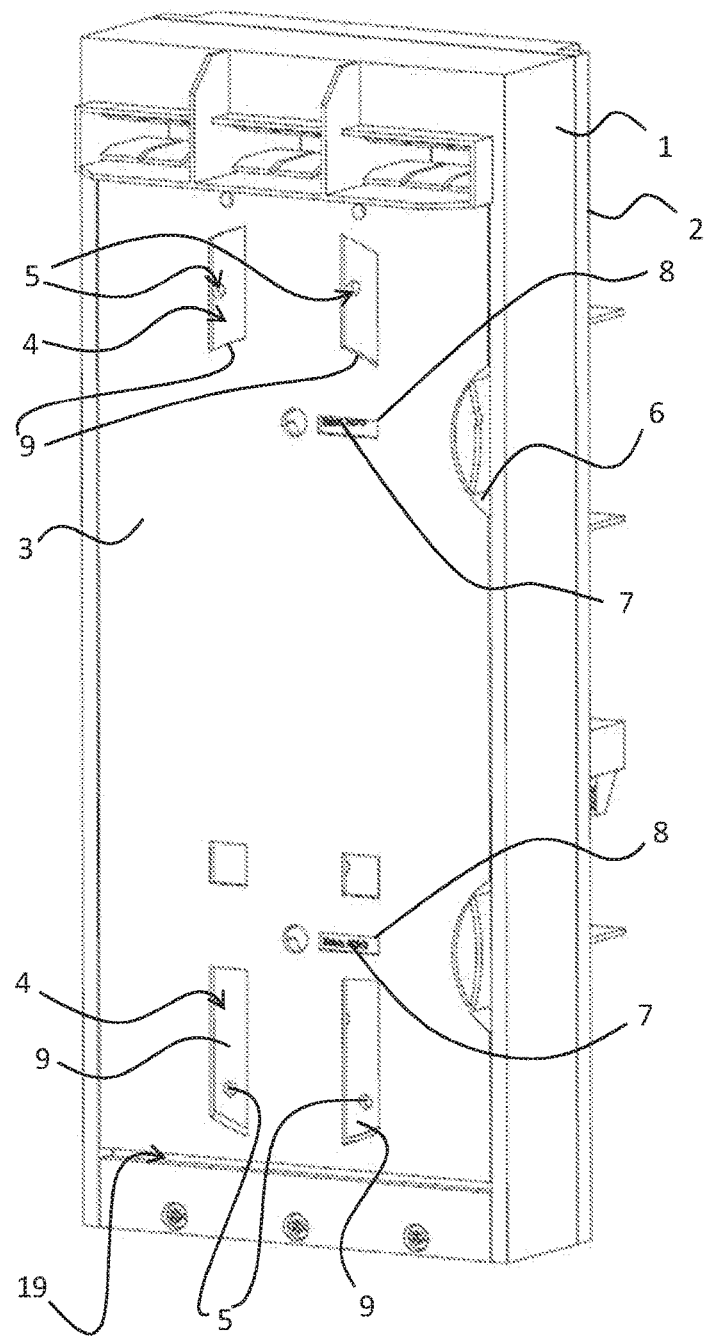
FIG. 2 shows the adapter according to FIG. 1 with a fitted second mounting side.

FIG. 2 shows the adapter according to FIG. 1 closed, i.e. with attached cover which substantially forms the second mounting side 3. The second mounting side 3, or this cover, has various openings and apertures. For one, the second mounting side 3 has a grip aperture 6 to manually turn the rotary disk 4. The grip aperture 6 is formed as a side cut-out in the cover which forms the mounting side 3. There is a cut-out 6 for the upper and lower rotary disks 4.

Furthermore, the second mounting side 3 has two openings 9 per rotary disk in which the threaded inserts 5 appear which belong to the respective set of threaded inserts 5 which is currently in the mounting position. There is one opening 9 per threaded insert 5. The second mounting side 3 furthermore has a viewing window 8 where it is possible to see the respective inscription 7 which indicates which set of threaded inserts 5 is currently in the mounting position and is therefore accessible through the openings 9.

This makes the invented adapter easy to use. The user must simply manually align the rotary disks 4 via the grip apertures 6 so that the inscription 7 of the circuit board which is to be mounted appears in the viewing window 8. Then it is guaranteed that the respective threaded inserts 5 are accessible through the openings 9 and are brought into the mounting position which is needed to mount the desired type of circuit breaker.

Figure 3:
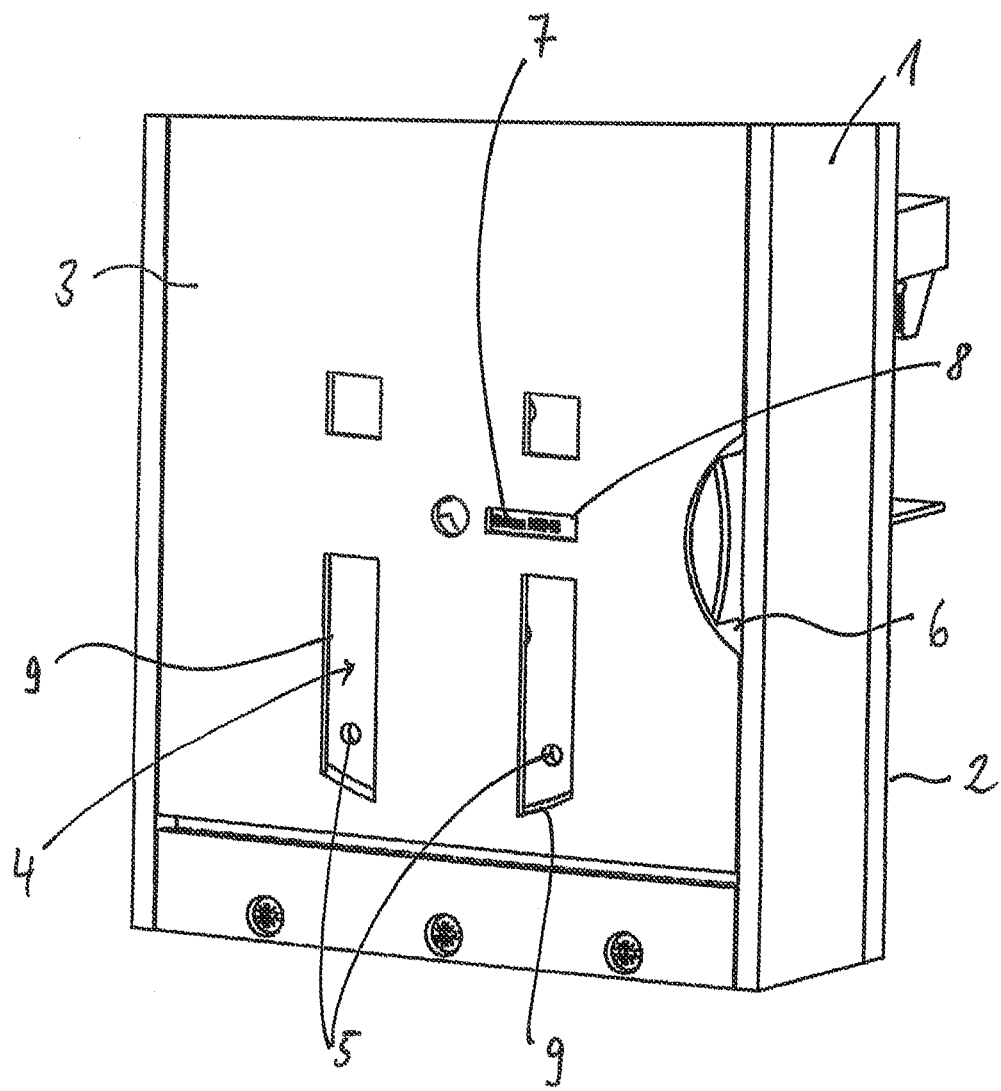
FIG. 3 shows a detailed view of the lower half of the adapter according to FIG. 2.

FIG. 3 shows a detailed view of the lower half of the adapter according to FIG. 2. One opening 9 per threaded insert 5 of the set of threaded inserts consisting of two threaded inserts 5 can be seen. The cover forming the second mounting side 3 and the openings 9 which are part of it are formed so that only the threaded inserts 5 which are needed for mounting the type of circuit breaker which is apparent by looking through the viewing window 8 are accessible through the openings 9. All other threaded inserts 5 from other sets of threaded inserts for the mounting of other types of circuit breakers are covered by the cover which forms the mounting side 3.

Figure 4:
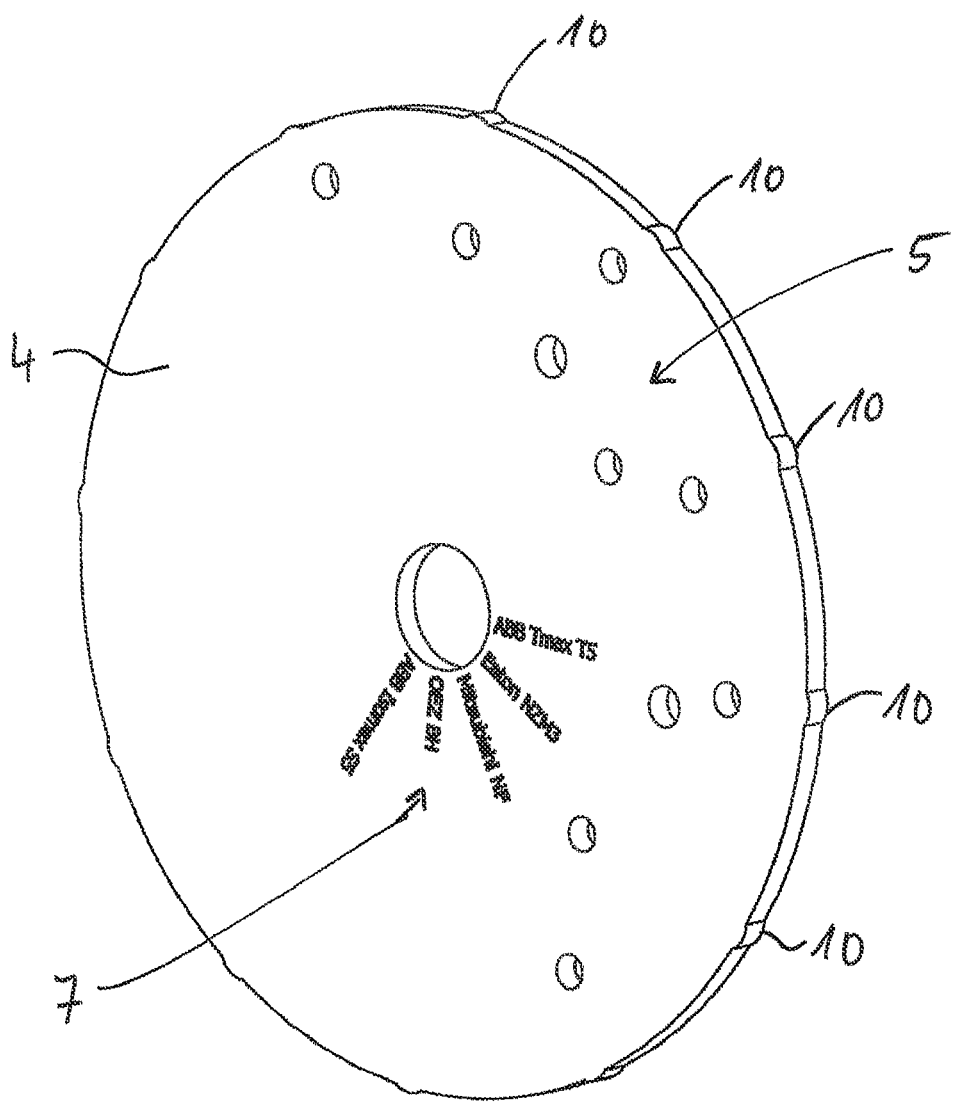
FIG. 4 shows a detailed view of the adapter's rotary disk according to the embodiment of FIGS. 1 through 3.

FIG. 4 shows the rotary disk 4 of the invented adapter in detail. In a middle area the inscriptions 7 stretch away from each other at angles to indicate the threaded inserts 5. The inscriptions stretch radially so that by turning the rotary disk 4 a desired inscription 7 lines up with the viewing window 8 (see FIG. 3). The inscriptions 7 are arranged regarding the sets of threaded inserts consisting of threaded inserts 5 so that, taking the openings 9 and the viewing window 8 into consideration, the threaded inserts 5 are accessible in the openings 9 the indicatory inscription 7 of which appears in the viewing window 8.

Figure 5:
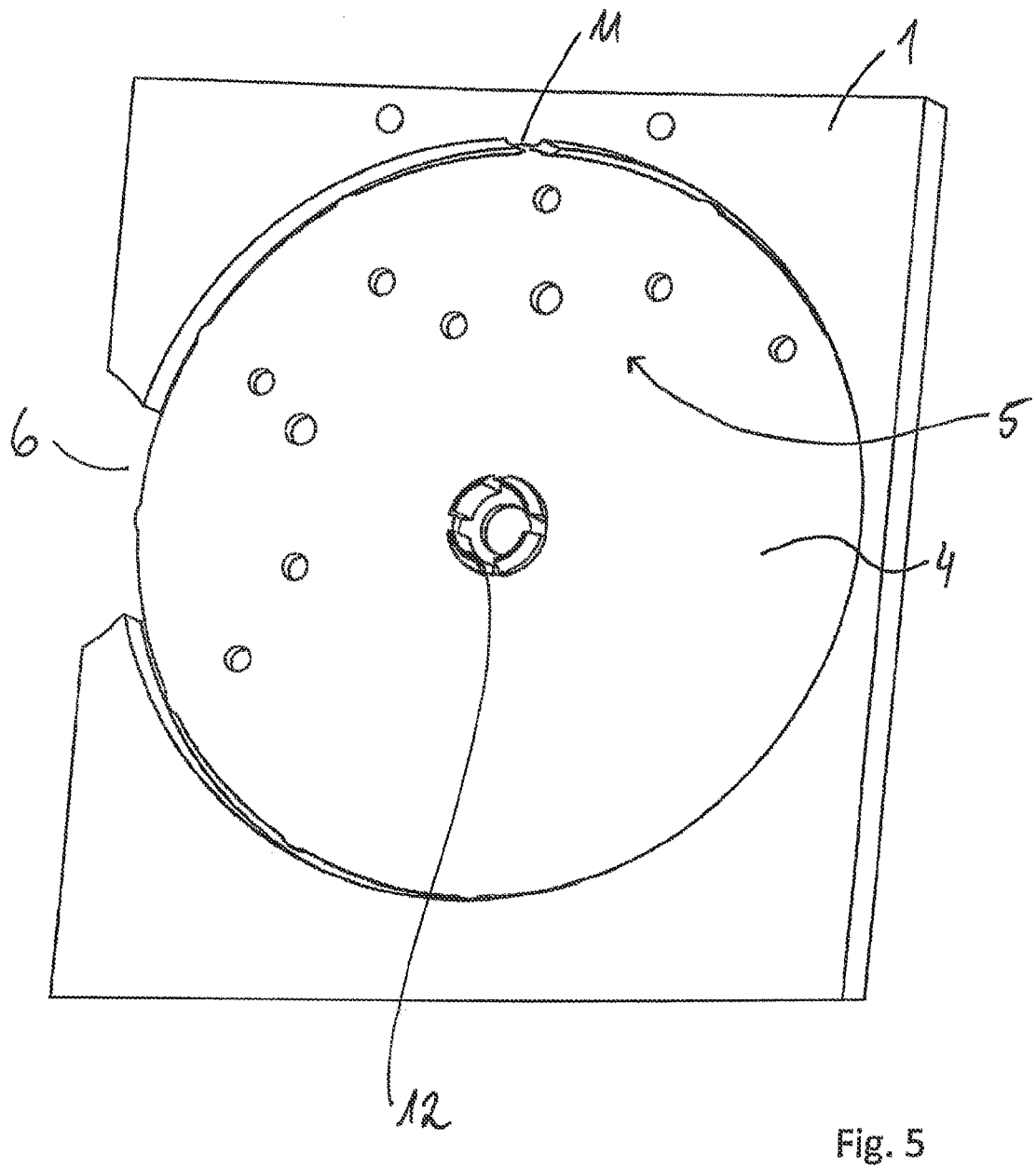
FIG. 5 shows a detailed view of the adapter's rotary disk according to the embodiment of FIGS. 1 through 4 incorporated into the adapter casing.

The rotary disk 4 has latches 10 on its exterior circumference. The latches 10 are spaced regularly. As can be seen in FIG. 5, the casing 1 has an insert inside for the rotary disk 4 having a latch site 11 in which the rotary disk's 4 latches 10 can be brought into a lock-in position by turning the rotary disk 4. The latches 10 on the exterior circumference of the rotary disk 4 are arranged in respect to the sets of threaded inserts and the inscriptions 7 so that the rotary disk 4 is precisely in the lock-in position when one of the sets of threaded inserts 5 is positioned in the mounting position and consequently the corresponding threaded inserts 5 are accessible via the openings 9 (see FIG. 3) and the indicatory inscription 7 for the appropriate type of circuit breaker is visible through the viewing window 8.

The casing has a turning shaft 12 on which the locking disk is clipped. The locking disk itself can therefore be formed as a comparably simple sheet metal part with a central through bore as bearing.

Figure 6:
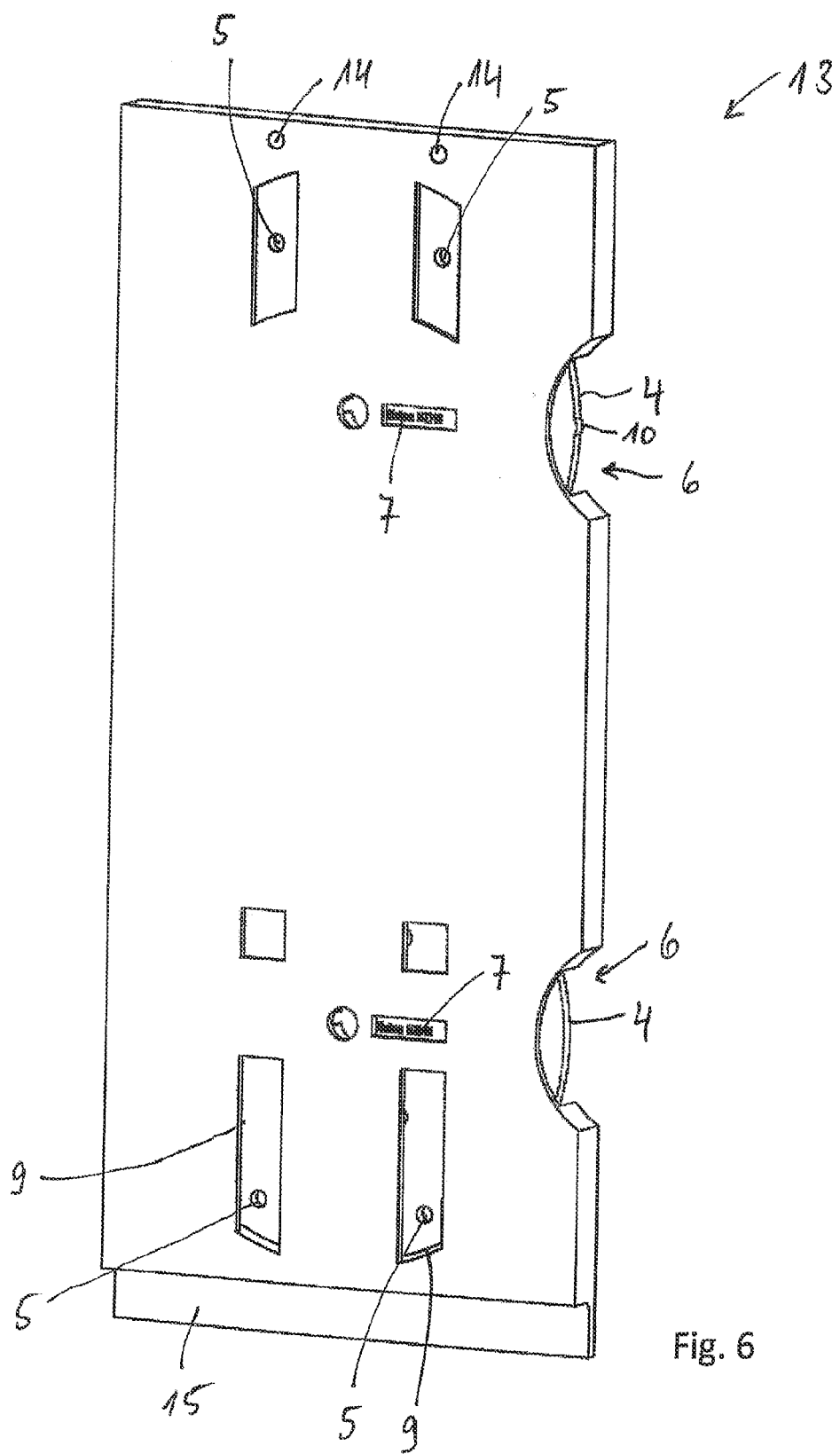
FIG. 6 shows another embodiment of the adapter, wherein at least one rotary disk is a component of a separate adapter plate, which is shown in a perspective front view.
Figure 7:
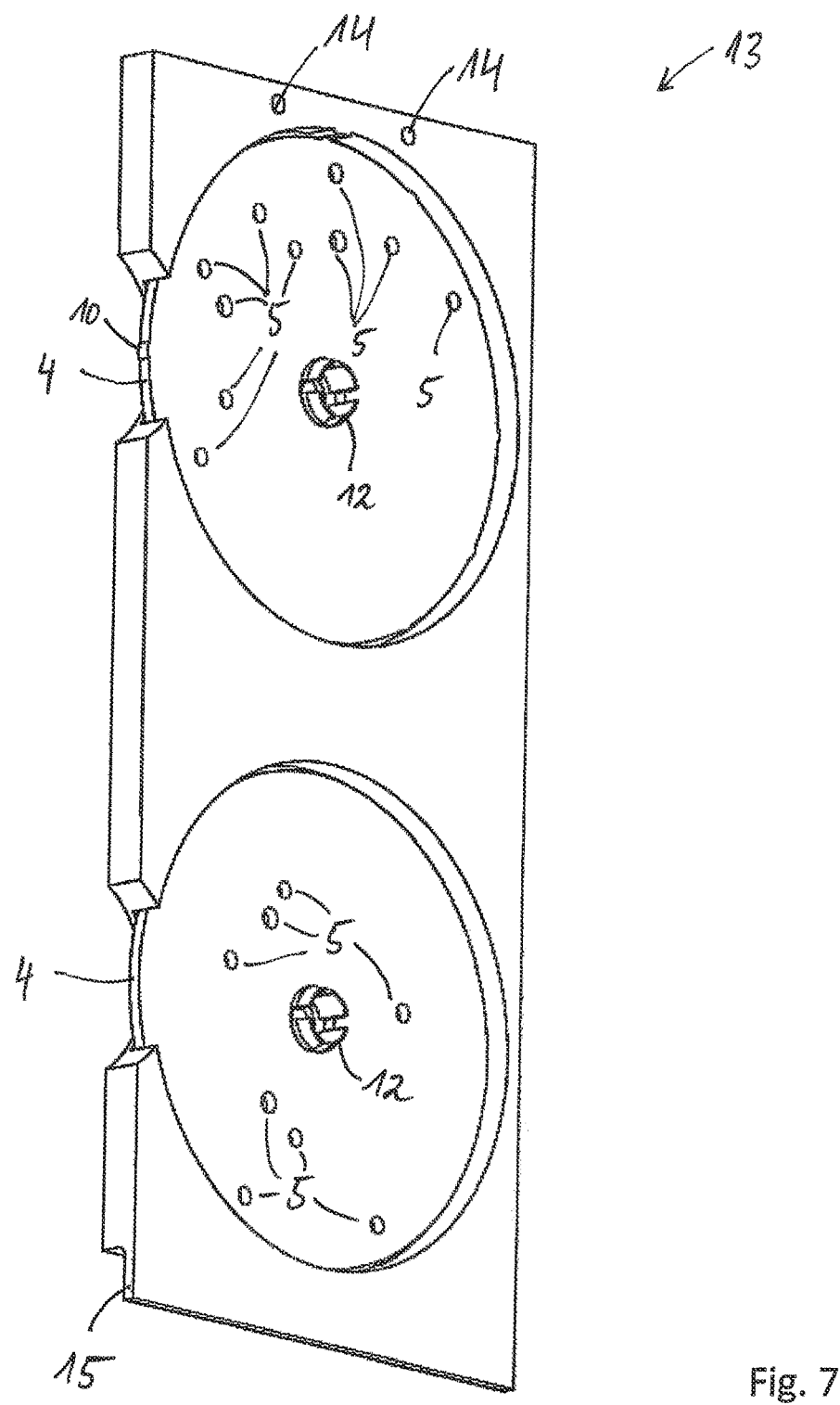
FIG. 7 shows the adapter plate according to FIG. 6 in a perspective rear view.
Figure 8:
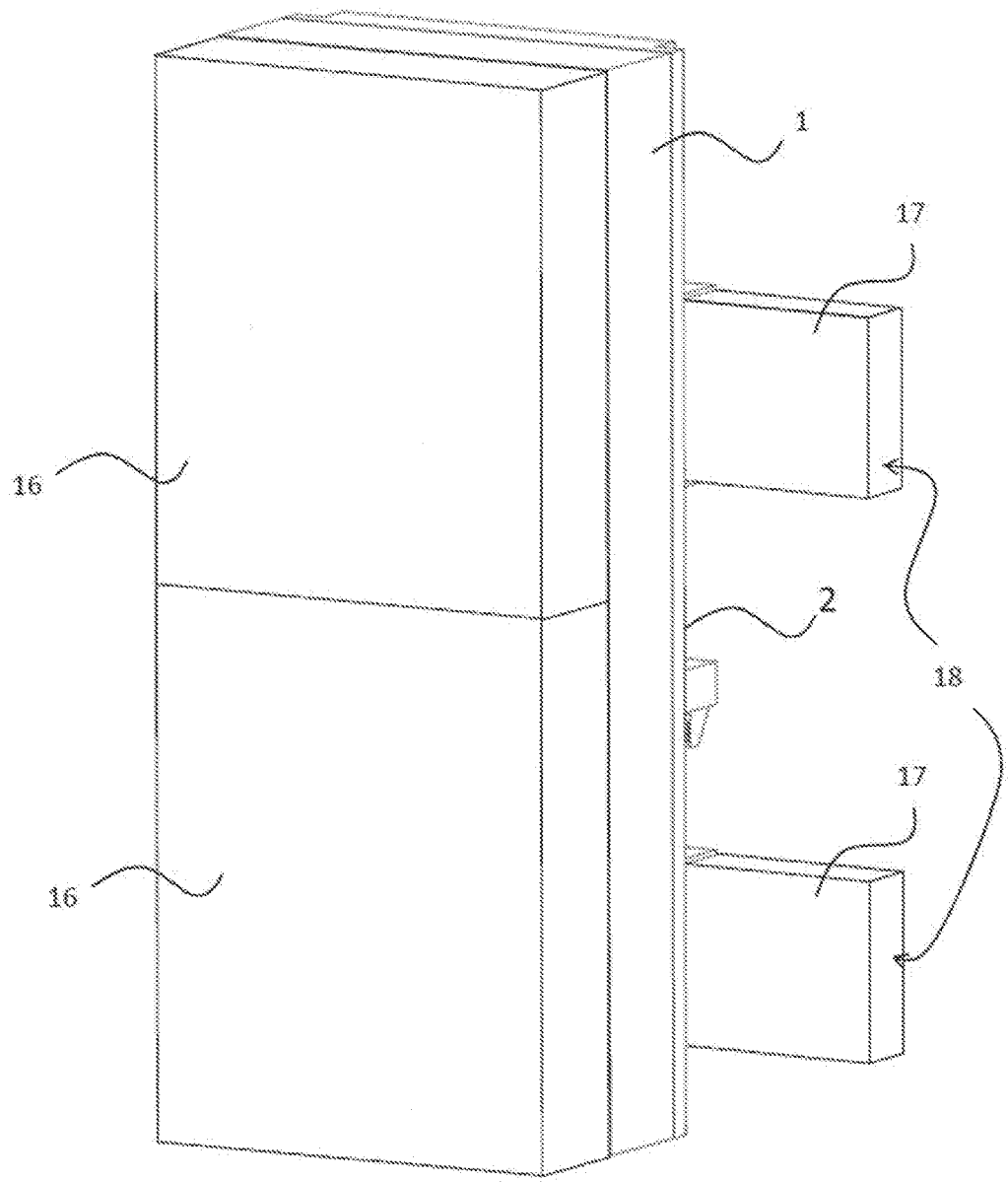
FIG. 8 shows the adaptor of FIG. 1 connected to two circuit breakers and two busbars forming a busbar system.

The FIGS. 6 and 7 depict an embodiment of the invented adapter, more precisely, an adapter plate 13 which can be used in connection with a casing that deviates from the embodiments shown in FIGS. 1-5 and instead of having fixed constructed rotary disks 4 it has an adapter plate insert 19 for receiving the adapter plate 13. To receive the adapter plate 13 in the adapter plate insert 19, the adapter plate 13 has a suspension ledge 15 on its horizontal lower longitudinal side which can be inserted into an appropriate socket opening of the casing's adapter plate insert 19. On the opposite upper horizontal longitudinal side there are fastening apertures for screws or similar fixings through which the adapter plate 13 can be attached to the casing's adapter plate insert 19.

To attach a circuit breaker 16 to a busbar 17 of a busbar system 18, in one first step, the adapter plate 13 can be fixed to a circuit breaker using the threaded inserts 5 as described above. Once the prepared circuit breaker is connected to the adapter plate 13, the adapter plate can be attached to the casing of the adapter using the suspension ledge 15 and the fastening apertures 14. So, for example, this means that the circuit breakers can be pre-assembled with the adapter plates 13 so that the final mounting simply consists of having to attach or screw the circuit breakers to casing's adapter plate inserts using the adapter plate 13. Instead of screw connecting there are also other connection technologies which can be considered to connect the adapter plate 13 with the casing, clip connections for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An adapter for connecting any one of a plurality of circuit breakers of different types to a busbar system, the adaptor comprising:
   a casing having a first mounting side to attach and electrically connect the adapter to at least one busbar of the busbar system, and a second mounting side to attach and electrically connect any one of the plurality of circuit breakers of different types to the casing; and
   on the second mounting side is at least one rotary disk with several sets of threaded inserts, the rotary disk and threaded inserts thereof pivot around a rotational axis perpendicular to the mounting sides;
   wherein each one of the several sets of threaded inserts is equipped for mounting the adaptor to a different one of the plurality of circuit breakers of different types, for each rotational position of the rotary disk one of the plurality of sets of threaded inserts is positioned in a mounting position for one of the plurality of circuit breakers of different types;
   wherein the rotary disk is incorporated in the casing, wherein the rotary disk has inscriptions identifying the several sets of threaded inserts;
   wherein the second mounting side has a viewing window through which exactly one of the inscriptions can be seen according to the position of the rotary disk; and
   wherein the sets of threaded inserts, the inscriptions and the viewing window are positioned so that the inscription indicating a particular set of the several sets of threaded inserts is visible through the viewing window when the particular set of the several sets of threaded inserts is positioned in the mounting position.

2. The adapter according to claim 1, wherein the at least one rotary disk includes a first rotary disk and a second rotary disk that are positioned staggered on the second mounting side;
   wherein the several sets of threaded inserts are first several sets of threaded inserts included with the first rotary disk;
   wherein the second rotary disk includes second several sets of threaded inserts each equipped for mounting the adaptor to a different one of the plurality of circuit breakers of different types;
   wherein the first rotary disk provides at least a first fastening point for any one of the plurality of circuit breakers of different types formed by the first set of threaded inserts, and the second rotary disk provides at least a second fastening point formed by the second set of threaded inserts and positioned staggered to the first fastening point.

3. The adapter according to claim 1, wherein the rotary disk is incorporated in the casing, wherein the casing, in particular on the second mounting side, has a grip aperture to manually turn the rotary disk on the periphery of the rotary disk.

4. The adapter according to claim 1, wherein
   the second mounting side has at least one opening through which only the particular set of the several sets of threaded inserts in the mounting position is visible, and all other ones of the several sets of threaded inserts are not visible.

5. The adapter according to claim 1,
   wherein the rotary disk is seated within a recess inside of the casing;

wherein the rotary disk has a substantially circular exterior circumference having latches;

wherein a latch site is located on the substantially circular inner circumference of the recess in the inside of the casing, and the latch site corresponds to the latches to receive any one of the latches therein; and wherein the sets of threaded inserts, the latches and the latch site are positioned so that the rotary disk is in a corresponding lock-in position when one of the sets of threaded inserts is in the mounting position.

6. The adapter according to claim 1, wherein the second mounting side is formed as an optionally removable cover for the inside of the casing in which the at least one rotary disk is incorporated, wherein the at least one rotary disk is interchangeably fixed to a turning shaft in the inside of the casing and is particularly clipped.

7. The adapter according to claim 1, further having an adapter plate formed as a separate component having the at least one rotary disk, wherein the adapter plate is attached to the casing with the at least one rotary disk.

8. The adapter according to claim 7, wherein the adapter plate is attached to an adapter plate insert of the casing with a releasable connection, the releasable connection including a screw or latch connection.

9. The adapter according to claim 7, wherein the adapter plate is pre-mounted to any one of the plurality of circuit breakers of different types so that the circuit breaker to which the plate is pre-mounted and the adapter plate can be attached to the casing by inserting the adapter plate into the adaptor plate insert.

* * * * *